B. N. YOUNG.
PERCOLATOR.
APPLICATION FILED AUG. 30, 1909.
947,143.
Patented Jan. 18, 1910.
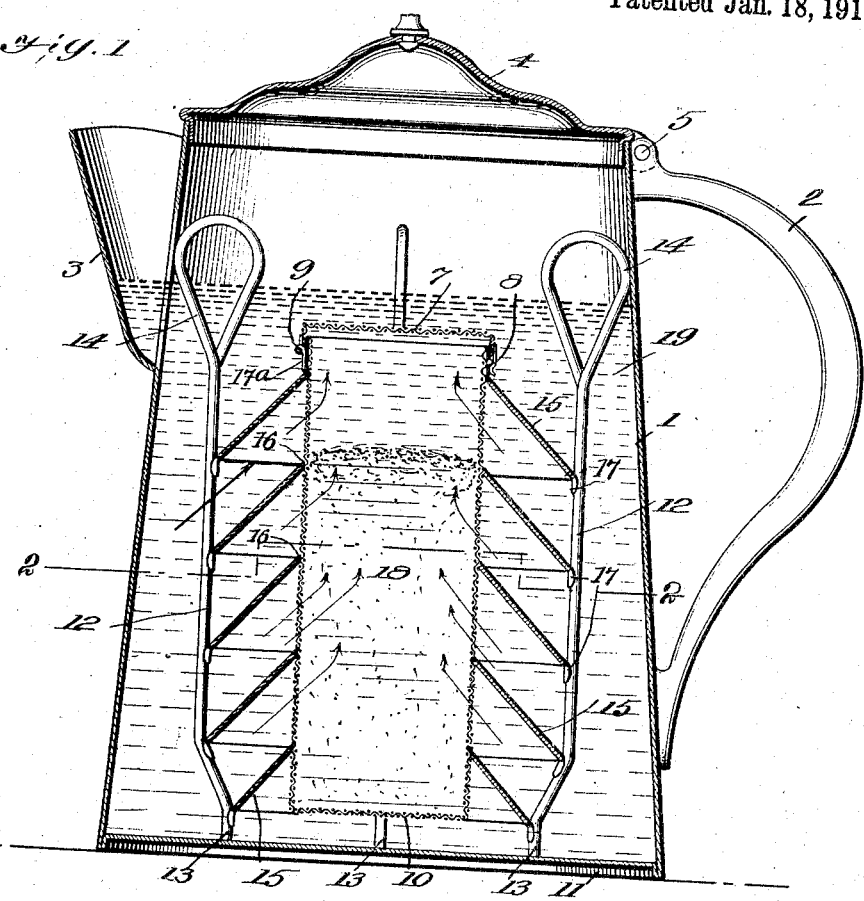
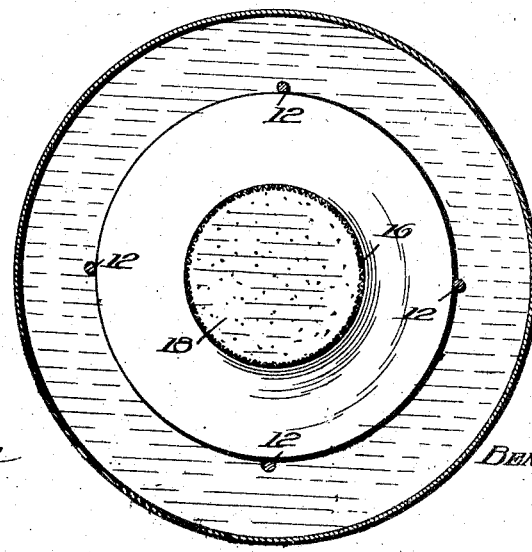
WITNESSES
INVENTOR
BENSON N. YOUNG
BY
ATTORNEYS

UNITED STATES PATENT OFFICE.

BENSON NUGENT YOUNG, OF OTTUMWA, IOWA.

PERCOLATOR.

947,143.  Specification of Letters Patent.  Patented Jan. 18, 1910.

Application filed August 30, 1909. Serial No. 515,180.

*To all whom it may concern:*

Be it known that I, BENSON NUGENT YOUNG, a citizen of the United States, and a resident of Ottumwa, in the county of Wapello and State of Iowa, have invented certain new and useful Improvements in Percolators, of which the following is a specification.

My invention is an improvement in percolators, and consists in certain novel constructions and combinations of parts hereinafter described and claimed.

The object of the invention is to provide a device of the class described, which may be cheaply constructed, and which may be applied to existing coffee pots without any change therein.

Referring to the drawings forming a part hereof, Figure 1 is a longitudinal section, and Fig. 2 is a section on the line 2—2 of Fig. 1.

The present embodiment of the invention consists of a substantially cylindrical container or vessel 1 which is frusto conical in form and arranged with its base downward, and the vessel is provided with the usual handle 2, spout 3, and cover 4, which is hinged to the handle as at 5.

Within the vessel is arranged a substantially cylindrical receptacle 6 of perforate material preferably of wire gauze, as shown, and the receptacle is provided with a cover 7 of similar material, hinged to the receptacle as at 8, and provided with a snap fastening 9.

The bottom 10 of the receptacle is also of perforate material, and the said receptacle is supported above the bottom 11 of the container, by means of a plurality, three in the present instance, of rods or standards 12, each of which is provided near its lower end with an inwardly offset portion 13, and at its upper end with a loop or ring 14.

The standards are connected to the receptacle by means of a plurality of nested frusto conical rings or shields 15, whose central opening 16 fits the periphery of the receptacle, and is secured thereto in any suitable manner, while the outer edges are secured to the standards as at 17, preferably by soldering.

The bottoms of the standards rest upon the bottom of the vessel, and the opening for the cover 4 is sufficiently large to permit the removal of the receptacle and its supporting means, by inserting the fingers through the rings or loops 14.

It will be observed that the rings 15 are so arranged with respect to each other, that the outer edge of each ring is below the level of the inner edge of the preceding ring, and the outer edge of the lowermost ring is below the bottom of the receptacle, and that part of the receptacle above the inner edge of the uppermost ring is closed by a plain ring 17ª. By this arrangement the liquid cannot pass directly to the receptacle in a lateral direction at any part, but is always deflected upward by the rings. It will be evident that the vessel 1 is the ordinary form of coffee pot, and the improvement may be made in different sizes to fit different sizes of pots.

The mesh or size of the perforations should be sufficiently small to prevent the passage of the grounds of coffee, and the receptacle may be of any desired material, that is suitable for the purpose. A greater number of standards may also be used, and it is evident that many changes in construction might be made without departing from the spirit of the invention.

In the use of the device, the receptacle is filled to about the level of the inner edge, of the second ring from the top, with coffee 18, ground to a suitable degree of fineness and the receptacle may be removed for this purpose if desired. The water 19 is now poured into the container to about the level indicated.

The water is directed inwardly and upwardly into the receptacle by the rings, and percolates upward through the ground coffee, passing out at the top, as indicated by the arrows. The water in contact with the periphery of the vessel is cooled by radiation, and settles downwardly, when it is again heated and rises following the direction of the arrows.

The improved percolator is also adapted for the making of postum, and similar beverages, and it will be observed that the coffee or postum is always submerged, so that the air is excluded therefrom. Neither is there any possibility of burning the coffee, since it is elevated above the bottom of the vessel.

The percolator may be easily removed for cleaning or filling, and is as easily replaced, and requires no care after filling. Hence no particular skill is required to make a good article of coffee. It may be applied to existing coffee pots without any change, since the improvement is an entity and independent of the pot.

The outer edges of the flanges are preferably beaded or crimped, to prevent injury to the hands in cleaning, and the loops 14 of the standards should stand far enough laterally from the peripheral surface of the receptacle, so that their engagement with the wall of the vessel will space the receptacle therefrom.

I claim:

1. A device of the class described, comprising a receptacle of perforate material, and substantially cylindrical in shape, a perforate cover hinged to the receptacle for closing the same, a plurality of standards having their lower ends offset inwardly and provided at their upper ends with loops for the purpose specified, and frusto conical rings arranged in nested relation and connected by their outer edges to the standards, the inner edges of the rings fitting the periphery of the receptacle and being secured thereto, said rings being so arranged that the outer edge of each ring is below the inner edge of the preceding ring, the ends of the standards extending below the bottom of the receptacle.

2. The combination with the vessel, of a substantially cylindrical receptacle of perforate material, a cover hinged to the receptacle for closing the same, a plurality of frusto conical rings whose central openings fit the receptacle, and are secured thereto, said rings being arranged in spaced relation, with the bases downward and with the outer edge of each ring below the inner edge of the succeeding ring, and standards secured to the outer edges of the rings and extending below the bottom of the receptacle and engaging the bottom of the vessel, said standards having loops at their upper ends extending laterally beyond the periphery of the receptacle, for the purpose specified.

3. The combination with the vessel, of a receptacle therein of perforate material, a perforate cover for the receptacle, a plurality of frusto-conical rings having central openings fitting the periphery of the receptacle and secured thereto, said rings being arranged with their bases downward and in spaced overlapping relation, and standards to which the rings are secured, said standards projecting below the bottom of the receptacle, and having loops at their upper ends extending laterally beyond the receptacle for the purpose specified.

4. The combination with the vessel, of a receptacle therein of perforate material, a perforate cover for the receptacle, a plurality of frusto-conical rings whose central openings fit the periphery of the receptacle and are secured thereto, said rings being arranged with their bases downward and in spaced overlapping relation, the base of each ring being below the top of the succeeding ring and standards to which the rings are secured, said standards projecting below the bottom of the receptacle.

5. The combination with the vessel, of a receptacle therein of perforate material, a perforate cover for the receptacle, a plurality of frusto-conical rings whose central openings fit the periphery of the receptacle and are secured thereto, said rings being arranged with their bases downward and in spaced overlapping relation, the base of each ring being below the top of the succeeding ring and standards to which the rings are secured.

6. As an article of manufacture, a perforate receptacle, a perforate cover therefor, standards extending above and below the receptacle, and having loops at their upper ends for the purpose specified, and imperforate shields encircling the receptacle at spaced intervals and connecting it to the standards the base of each ring being below the top of the succeeding ring.

7. As an article of manufacture, a perforate receptacle, standards extending below the receptacle and annular imperforate shields encircling the receptacle and connecting it with the standards, said shields being arranged in spaced overlapping relation and inclining outwardly and downwardly from the receptacle the base of each ring being below the top of the succeeding ring.

8. As an article of manufacture a perforate receptacle, standards, spaced apart radially from the receptacle, and annular shields encircling the receptacle and connecting it with the standards.

9. As an article of manufacture a perforate receptacle, standards, spaced apart radially from the receptacle, and annular shields encircling the receptacle and connecting it with the standards, said shields being frusto-conical rings arranged in overlapping relation, and with the base of each ring below the top of the succeeding ring for the purpose specified.

BENSON NUGENT YOUNG

Witnesses:
CHARLES CLOSSEN,
WADE T. KIRKPATRICK.